United States Patent [19]

Judin et al.

[11] 4,271,282
[45] Jun. 2, 1981

[54] PROCESS FOR PRODUCING CARBO-CHAIN HOMO-POLYMERS, BLOCK- AND RANDOM COPOLYMERS OF CONJUGATED DIENES WITH VINYL-AROMATIC MONOMERS

[76] Inventors: Viktor P. Judin, pereulok Mendeleeva, 7, kv. 71; Valentin P. Shatalov, ulitsa Geroev Stratosfery, 1, kv. 4; Leonid V. Kovtunenko, Leninsky prospekt, 13, kv. 46; Valeria G. Shalganova, ulitsa Koltsovskaya, 54, kv. 57; Nadezhda K. Kashkina, ulitsa Skladskaya, 2, kv. 25; Lidia N. Mistjukova, ulitsa Merkulova, 4, kv. 53; Neonila M. Semenova, ulitsa Tsiolkovskogo, 7/2, kv. 56; Zinaida N. Korbanova, ulitsa Mendeleeva, 3, kv. 10; Ivan P. Mitin, ulitsa Rostovskaya, 46/6, kv. 7; Vladimir V. Moiseev, Leninsky prospekt, 63, kv. 12; Vladimir V. Kosovtsev, Leninsky prospekt, 13, kv. 13,, all of Voronezh, U.S.S.R.

[21] Appl. No.: 68,520

[22] Filed: Aug. 22, 1979

[51] Int. Cl.$^3$ ............................................. C08F 4/48
[52] U.S. Cl. ........................... 526/174; 260/33.6 UA; 525/217; 525/250; 525/271; 525/314; 526/340; 526/335; 526/284; 526/346; 526/340.2; 526/337; 525/534; 525/502; 525/92; 525/152; 525/132
[58] Field of Search ................. 525/250, 271, 217; 526/174; 260/33.6 UA

[56] References Cited
U.S. PATENT DOCUMENTS

| | | | |
|---|---|---|---|
| 3,294,768 | 12/1966 | Wofford | 526/174 |
| 3,496,154 | 2/1970 | Wofford | 526/174 |
| 3,718,637 | 2/1973 | Halasa | 526/174 |
| 3,759,919 | 9/1973 | Dillenschneider | 526/174 |
| 3,954,700 | 5/1976 | Farham | 526/174 |

FOREIGN PATENT DOCUMENTS 45-38067 12/1970 Japan ........................................ 526/174

Primary Examiner—William F. Hamrock
Attorney, Agent, or Firm—Robert E. Burns; Emmanuel J. Lobato; Bruce L. Adams

[57] ABSTRACT

A process for producing carbo-chain homopolymers, block- and random copolymers of conjugated dienes and vinylaromatic monomers comprising polymerization of dienes, vinyl- or di-vinylaromatic monomers or copolymerization thereof in a medium of a hydrocarbon solvent at a temperature ranging from $-30°$ to $+150°$ C. in the presence of an organolithium catalyst of the formula $R(Li)_x$, wherein R is a hydrocarbon radical or a diene polymer, x is an integer of from 1 to 4, and a modifying additive which is a compound comprising a product of interaction between a phenolamine resin and an alkali metal and having the general formula:

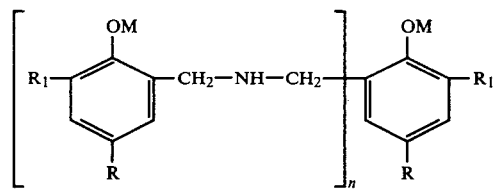

wherein
n is an integer of from 1 to 10;
M is sodium or potassium;
R is an alkyl with 2 to 20 carbon atoms or an arylalkyl with 7 to 20 carbon atoms;
$R_1$ is an alkyl with 1 to 6 carbon atoms, an arylalkyl with 7 to 9 carbon atoms or hydrogen;

this modifying additive is used in an amount of from 0.07 to 2.0 g/equiv. per one g/equiv. of active lithium.

7 Claims, No Drawings

PROCESS FOR PRODUCING CARBO-CHAIN HOMO-POLYMERS, BLOCK- AND RANDOM COPOLYMERS OF CONJUGATED DIENES WITH VINYL-AROMATIC MONOMERS

BACKGROUND OF THE INVENTION

The present invention relates to processes for the production of polymers, and more specifically, to a process for producing carbo-chain homopolymers, block- and random copolymers of conjugated dienes with vinylaromatic monomers; the resulting polymers are employed as a material for the manufacture of tyres, rubber-engineering articles, rubber footwear. Articles manufactured from such polymers are not inferior to articles made of natural rubber in respect of their cracking-resistance and heat-formation.

Carbo-chain block- and random copolymers can be used in the production of cables owing to their high dielectric properties.

A process is known in the art for producing carbo-chain homopolymers, block- and random copolymers by polymerization of conjugated dienes, vinyl- or divinylaromatic monomers or intercopolymerization thereof in an inert hydrocarbon solvent medium at a temperature within the range of from $-30°$ to $150°$ C. in the presence of an organolithium catalyst and a modifying additive, i.e. a compound of the general formula $R—(OM)_n$, wherein n is an integer of from 1 to 3, M is potassium, sodium, rubidium or cesium; R is an aliphatic, aromatic or a cycloaliphatic radical.

This prior art process has the disadvantage that the organic compounds of alkali metals containing at most 20 carbon atoms are employed as the modifying additive and these compounds are but sparingly soluble in aliphatic, cycloaliphatic and aromatic hydrocarbons. In the practice of this process it is necessary to disperse these insoluble products, which is accompanied by difficulties in storage and the precise metering of the resulting suspensions into the reaction medium. By-products formed with the use of oxygen-containing organic compounds of alkali metals with a number of carbon atoms below 20 are volatile and can contaminate the recycle solvent thus necessitating additional investments for its purification. Furthermore, the polymerizate is unstable and, to prevent destruction of the resulting polymer upon recovery and drying thereof, stabilizing agents should be introduced thereinto. All this complicates the polymerization process technology.

A process is also known in the art for producing carbo-chain random copolymers of conjugated dienes with vinylaromatic monomers in a hydrocarbon solvent.

The process is conducted at a temperature within the range of from $-30°$ to $150°$ C. in the presence of a catalyst comprising a compound of the general formula $R(Li)_x$, wherein R is a hydrocarbon radical containing 1 to 20 carbon atoms, x is an integer of from 1 to 4, and in the presence of an additive comprising an organometallic compound. Such compounds can be those corresponding to formulae: $R'M$, $R'(yM)_n$; $R''(C-yM)_n$ and the like, wherein R' is a hydrocarbon radical with 1 to 20 carbon atoms, R'' is a hydrocarbon radical with 4 to 20 carbon atoms, y is an atom of oxygen or sulphur; n is an integer of from 1 to 3, and M is sodium, potassium, rubidium or cesium.

As a solvent for the copolymerization use is made of aliphatic, aromatic and cycloaliphatic hydrocarbons. As a result, a solution of a copolymer is obtained, which is then added with an antioxidant. Afterwards, the desired product is recovered by conventional methods (cf. British Pat. No. 1,029,445).

This prior art process has disadvantages for example, the organic compounds of alkali metals corresponding to the above-given formulae are sparingly soluble in aliphatic, cycloaliphatic and aromatic hydrocarbons. In the practical implementation of this process it is necessary to form suspensions of these insoluble products. Furthermore difficulties are encountered in storage and the precise metering of the dispersion prior to admission thereof into the reaction system, especially in performing a continuous polymerization process.

The resulting polymerizate is unstable and, to prevent the polymer destruction upon recovery and drying thereof, a stabilizing agent must be added.

Furthermore, in the case of using, as modifying additives, oxygen- and sulphur-containing organic compounds of alkali metals volatile organic by-products are liberated which can contaminate the recycle solvent, thus necessitating additional expenses for purification thereof.

A, apart from the above-discussed processes, a process is known in the art for producing carbo-chain random copolymers of conjugated dienes with vinylaromatic monomers (cf. British Pat. No. 1,501,136) comprising copolymerization of conjugated dienes with vinylaromatic monomers in a hydrocarbon solvent medium at a temperature within the range of from $-30°$ to $150°$ C. in the presence of a catalyst, i.e. lithium or an organolithium compound of the general formula $R(Li)_x$, wherein R is a hydrocarbon radical, x is an integer of from 1 to 4, in the presence of a modifying additive comprising a reaction product of alkali metals Na, K, Rb, Cs or hydroxides thereof with conjugated diene homopolymers or copolymers with terminal hydroxy groups having molecular weight of from 500 to 5,000 or compounds of the general formula $R_1(M)_y$, wherein

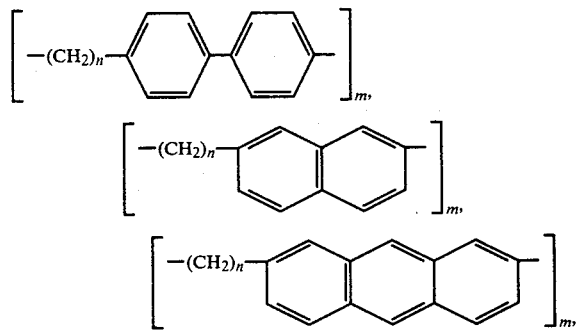

wherein n is an integer of from 1 to 5; m is an integer of from 4 to 100, M is the alkali metals mentioned hereinbefore, y is an integer of 1 to 10; said additives being taken in an amount ranging from 0.005 to 2.5 moles per one mole of active lithium.

This prior art process has a disadvantage residing in instability of the polymerization product due to the fact that the modifying additive employed does not prevent the oxidation of the polymer.

SUMMARY OF THE INVENTION

It is an object of the present invention to provide a process for producing carbo-chain homopolymers, block- and random copolymers of conjugated dienes with vinylaromatic monomers which would make it possible to overcome the above-mentioned disadvantage.

It is the main object of the present invention to provide such a process for producing carbo-chain homopolymers, block- and random copolymers of conjugated dienes with vinyl aromatic monomers which would make it possible to increase the desired product stability through the use of a modifying additive preventing oxidation of the polymer.

These and other objects are accomplished by a process for producing carbo-chain homopolymers, block- and random copolymers of conjugated dienes with vinylaromatic monomers or co-polymerization thereof in a medium of a hydrocarbon solvent at a temperature within the range of from −30° to 150° C. in the presence of an organolithium catalyst of the general formula $R(Li)_x$, wherein R is a hydrocarbon radical or a diene polymer, x is an integer of from 1 to 4, and a modifying additive, in accordance with the present invention, as the modifying additive use is made of a compound comprising a product of interaction of a phenol-amine resin and alkali metals and having the general formula:

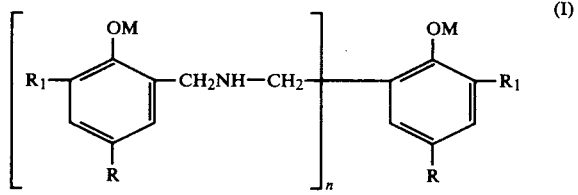

wherein n is an integer of from 1 to 10; M is sodium or potassium; R is an alkyl containing 2 to 20 carbon atoms or an arylalkyl containing 7 to 20 carbon atoms; $R_1$ is an alkyl containing 1 to 6 carbon atoms, an arylalkyl containing 7 to 9 carbon atoms or hydrogen which additive is taken in an amount of from 0.07 g/equiv. to 2.00 g/equiv. per one g/equiv. of active lithium.

The term active lithium as applied to the use of the above-mentioned organo-lithium compound of the general formula $R(Li)_x$ denotes lithium directly associated with carbon and serving as the polymerization center.

It is advisable to use, as the organolithium catalyst, n-butyllithium, sec.butyllithium, dilithiumpolydivinyl or polyisopropyllithium.

As a hydrocarbon solvent use can be made of aliphatic, cycloaliphatic, aromatic hydrocarbons and mixtures thereof. It is advisable to use, as the hydrocarbon solvent, cyclohexane, toluene, isopentane, hexane or hexane-heptane fraction of petroleum.

The process according to the present invention is performed in the following manner.

The starting monomers which are polymerized in the process according to the present invention comprise conjugated dienes, vinyl- or divinylaromatic compounds or mixtures of both. As the conjugated dienes use is made of dienes containing 4 to 12 carbon atoms per molecule, namely 1,3-butadiene, isoprene, 1,3-pentadiene, 2,3-dimethyl-1,3-butadiene, 2-methyl-1,3-pentadiene, 2-phenyl-1,3-butadiene and 4,5-diethyl-1,3-octadiene. It is preferred to use, as the conjugated diene, 1,3-butadiene and isoprene.

As the vinylaromatic compound (including divinylaromatic compounds) use can be made of compounds with 8 to 20 carbon atoms containing at least one vinyl group bound to the carbon atom of the aromatic ring, namely: styrene, 3,5-diethylstyrene, 2,4,6-trimethylstyrene, 4-cyclohexylstyrene, 4-phenylstyrene, 3,5-diphenylstyrene, vinylnaphthalene, 8-phenyl-1-vinylnaphthalene, divinylbenzene and the like. It is preferable to use styrene and divinylbenzene.

The above-mentioned starting monomers are subjected to polymerization or copolymerization therebetween in a medium of a hydrocarbon solvent.

As the hydrocarbon solvent use can be made of aliphatic, cycloaliphatic, aromatic hydrocarbons and mixtures thereof such as isopentane, hexane, heptane, octane, hexane and hexane-heptane petroleum fractions, cyclohexane, methylcyclohexane, benzene, toluene, xylene, ethylbenzene, isopropylbenzene, a mixture of cyclohexane with the hexane-heptane petroleum fraction, a mixture of toluene with the hexane-heptane petroleum fraction and the like.

The process of polymerization of the monomers is conducted at a temperature within the range of from −30° to +150° C., preferably from 20° to 100° C. In general, pressure during polymerization is maintained sufficient to keep the monomeric materials in the liquid state.

The polymerization process is conducted in the presence of an organolithium catalyst and a modifying additive.

As the lithium-organic catalyst use is made of an organolithium compound of the formula $R(Li)_x$, wherein R is a hydrocarbon radical or a diene polymer; x is an integer of from 1 to 4; for example, methyllithium, ethyllithium, n-butyllithium, naphthyllithium, tolyllithium, sec.butyllithium, tert.butyllithium, phenyllithium, cyclohexyllithium, 1,6-dilithiumnaphthalene, 1,3,5-trilithiumcyclohexane, 1,2,4,6-tetralithiumcyclohexane, dilithiumpolybutadienyl, dilithiumpolyisoprenyl, dilithiumpolystyryl and the like. The organolithium compound is taken preferably in an amount ranging from 0.2 to 50 mg/equiv. per 100 g of a mixture of the starting monomers depending on the molecular weight to be obtained.

As the modifying additive use is made of a reaction product of phenolamine resin with an alkali metal corresponding to the general formula

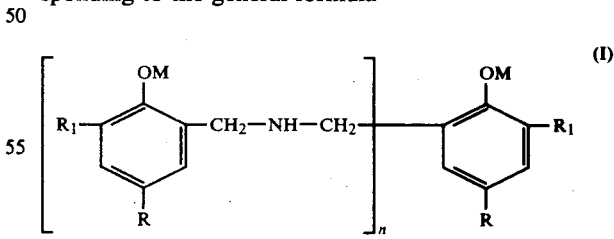

wherein n is an integer of from 1 to 10; R is an alkyl with a number of carbon atoms of from 2 to 20 or an arylalkyl with a number of carbon atoms of from 7 to 20; $R_1$ is an alkyl with a number of carbon atoms of from 1 to 6, or an arylalkyl with a number of carbon atoms of from 7 to 9, or hydrogen; M is sodium or potassium.

The modifying additive as used in the process according to the present invention is soluble in aliphatic, cycloaliphatic, aromatic hydrocarbons; it can be stored for a long time in the absence of moisture and oxygen; it can be readily dispensed and homogeneously distributed over the reaction medium. The modifying additive according to the present invention acts as a regulator of penetration of diene molecules into the polymeric chain with the formation of a predetermined microstructure; it also serves as an agent varying relative reactivity of diene, vinyl- and divinyl-aromatic hydrocarbons, thus providing an opportunity for the production of either block- or random copolymers of dienes and vinylaromatic monomers.

The modifying additive is introduced at a rate of 0.07 to 2.0 g/equiv. per one g/equiv. of active lithium serving as the polymerization center.

The aminophenolic resins formed after the decomposition of the modifying additive are not volatile and, which is most important, prevent oxidation of the polymer upon recovery and drying thereof.

The modifying additive according to the present invention is introduced into the reaction mixture as a solution in a hydrocarbon solvent or a mineral oil.

On completion of polymerization (conversion of from 50 to 99.9%), the reaction mixture is treated with an agent converting the modifying additive of the OH-form. As such agent use is made of water or acids.

The polymerization process can be performed both continuously and batch-wise. The process is carried out in an apparatus provided with an impeller, a cooling-and-heating jacket, means for charging the starting components and means for discharging the solution of homo- or copolymer.

The apparatus is preliminary freed from moisture and oxygen. A hydrocarbon solvent, a diene and vinylaromatic monomers, an organolithium compound and the modifying additive are fed into the apparatus in specified proportions in the atmosphere of an inert gas (nitrogen, argon).

In the continuous embodiment of the process according to the present invention the solvent and monomers in the form of a preliminary prepared mixture or separately are fed into a battery consisting of several apparatis; the catalyst and modifying additive are continuously supplied thereto as well.

On completion of polymerization, an additional quantity of the antioxidant is added to the copolymer solution and the polymer is recovered from the solution by conventional techniques (such as precipitation with alcohol, aqueous outgassing method or water-free outgassing method).

The process according to the present invention is technologically simple and can be implemented on a commercial scale. Owing to the use of the novel modifying additive preventing oxidation of the polymer, the process according to the present invention makes it possible to enhance stability of the desired product as compared to the prior art processes.

For a better understanding of the present invention, some specific Examples are given hereinbelow by way of illustration of the process according to the invention.

EXAMPLE 1

Into a preliminarily evacuated and nitrogen-filled apparatus there are charged 3,200 g of cyclohexane, 110 g of styrene, 330 g of divinyl, 6.36 mg/equiv. of dilithiumpolydivinyl and 0.84 mg/equiv. of a product of interaction between a phenolamine resin and sodium of formula (I) hereinbefore, wherein $n=4$, R is $C_8H_{17}$ and $R_1$ is hydrogen. The reaction mass is heated to the temperature of 65° C. and kept under stirring for 4 hours. On completion of the reaction, the polymer is deactivated by means of a solution of acetic acid (0.03 M), recovered by means of isopropanol and the polymer is dried on hot rolls. The polymer yield is 420 g (95.5%). Intrinsic viscosity is 1.19 dl/g (toluene, 25° C.). The divinyl portion has the following structure, %: 1,2-12.1; cis-1,4-45.9; trans-1,4-42. The content of block polystyrene is 5%. The block-copolymer has the structure type A-B-A, wherein B is a copolymer of butadiene and styrene, A is polystyrene.

EXAMPLE 2

Into an apparatus preconditioned as in Example 1 hereinabove there are changed 3,200 g of cyclohexane, 110 g of styrene, 330 g of 1,3-butadiene, 5 mg/equiv. of sec.butyllithium and 1.8 mg/equiv. of a product of interaction between a phenolamine resin with sodium of formula (I), wherein $n=1$, R is $C_8H_{17}$ and $R_1$ is $C_4H_9$. The reaction mass is heated to the temperature of 65° C. and maintained under stirring for 4 hours. On completion of the reaction the polymer is deactivated with water, recovered by means of alcohol and dried over hot rolls. In the course of the process samples are taken for different degrees of conversion to define the content of styrene. The data illustrating the content of combined styrene in the copolymer for different conversions are given in the following Table 1.

TABLE 1

| Time lapse from the beginning of polymerization, min | Monomer conversion, % | $n_D^{25}$ | Content of styrene in the copolymer, % |
| --- | --- | --- | --- |
| 5 | 20 | 1.5330 | 21.68 |
| 10 | 40 | 1.5340 | 22.85 |
| 15 | 50 | 1.5350 | 24.01 |
| 30 | 80 | 1.5350 | 24.01 |
| 120 | 100 | 1.5357 | 24.82 |

The polymer yield is 440 g (100%). Intrinsic viscosity is 1.8 dl/g. The polymer containes no block styrene and has the following structure of the diene portion, %:
  cis-1,4-units: 43.8
  trans-1,4-units: 31.2
  1,2-units: 18.

EXAMPLE 3

Into a preliminary evacuated and nitrogen-filled apparatus there are charged 3,200 g of cyclohexane, 110 g of styrene, 330 g of 1,3-butadiene, 5 mg/equiv. of n-butyllithium and 0.35 mg/equiv. of a solution, in cyclohexane, of a product of interaction between a phenolamine resin with potassium of formula (I) hereinbefore, wherein $n=4$, R is $C_8H_{17}$, $R_1$ is hydrogen. The reaction mass is heated to the temperature of 65° C. and maintained under stirring for 4 hours. On completion of the reaction the polymer is deactivated with a solution of acetic acid (0.03 mole), recovered with alcohol and dried over hot rolls. The polymer yield is 430 g (100%). Intrinsic viscosity is 1.45 dl/g. The structure of the divinyl portion is as follows, %:
  1,2-units: 12.7
  cis-1,4-units: 42.8
  trans-1,4-units: 44.5.

The polymer prepared by the procedure of Example 3 is subjected to oxidation at the temperature of 130° C. in the atmosphere of oxygen. The latent period is 130 minutes. The control sample produced with the use of potassium butylate starts to get oxidized without any latent period. The same sample prepared by the procedure of Example 3 when subjected to a thermal oxidation at the temperature of 130° C. in the atmosphere of oxygen for 30 minutes shows the Walles plasticity retention index of 47.5%. The control sample with 1% of Neozone D shows the index of 42.3%.

EXAMPLE 4

Into an apparatus preconditioned in much the same manner as in Example 3 there are charged 3,200 g of cyclohexane. 110 g of styrene, 330 g of 1,3-butadiene, 5 mg/equiv. of sec. butyllithium and 0.6 mg/equiv. of a solution, in cyclohexane, of a product of interaction between a phenolamine resin and potassium of formula (I), wherein n=10, R is $C_8H_{17}$ and $R_1$ is hydrogen. The reaction mass is heated to the temperature of 65° C. and maintained under stirring for 4 hours. On completion of the reaction the polymer is deactivated with water, recovered with alcohol and dried on hot rolls. In the course of the polymerization samples are taken for different degrees of conversion to determine the content of styrene. The data illustrating the content of combined styrene in the copolymer at different conversions are shown in Table 2 hereinbelow.

TABLE 2

| Time period from the beginning of the polymerization, min | Conversion of the monomers, % | $n_D^{25}$ | Content of styrene in the copolymer, % |
|---|---|---|---|
| 5 | 30 | 1.5357 | 24.8 |
| 10 | 50 | 1.5360 | 25.17 |
| 15 | 70 | 1.5360 | 25.17 |
| 30 | 86.5 | 1.5360 | 25.17 |
| 120 | 100 | 1.5360 | 25.17 |

The polymer yield is 440 g (100%). Intrinsic viscosity is 1.77 dl/g. The polymer contains no block styrene and has the following structure of the divinyl portion, %:
cis-1,4-units: 39.3
trans-1,4-units: 44.7
1,2-units: 16.0.

For physico-mechanical tests of the polymers produced in the foregoing Examples, rubber mixes are prepared according to the following formulation, parts by weight:
polymer: 100
carbon black: 40.0
stearic acid: 1.5
zinc oxide: 5.0
commercial sulphur: 2.0
altax: 3.0

The mixes are vulcanized at the temperature of 143° C. for 40, 60 and 80 minutes. The data illustrating properties of the thus-produced vulcanizates are shown in Table 3.

TABLE 3

| Characteristics | Polymer of Example | | | |
|---|---|---|---|---|
| | 1 | 2 | 3 | 4 |
| Tensile strength, kg/cm$^2$ | 215 | 272 | 245 | 270 |
| Relative elongation, % | 508 | 612 | 560 | 604 |
| Residual elongation, % | 20 | 16 | 20 | 16 |

EXAMPLE 5

Into a reactor in the atmosphere of argon there are charged 13.5 mg/equiv. of a solution, in hexane, of a product of interaction between a phenolamine resin and potassium of formula I, wherein n=10, R is $C_8H_{17}$, $R_1$ is $CH_3$, and 13.44 mg/equiv. of a solution is cyclohexane of sec.butyllithium. 73 ml of isoprene are added thereto at the temperature of 25° C. After 6 days at the temperature of 25° C. the polymer is precipitated with isopropanol. There are obtained 4.7 g of the polymer; its intrinsic viscosity is 2.53 dl/g; the content of units is as follows, %:
cis-1,4-units: 1
trans-1,4-units: 74
3,4-units: 25.

EXAMPLE 6

Into a preliminary evacuated and nitrogen-filled apparatus there are charged 3,000 g of a mixture of cyclohexane with hexane-heptane fraction in the weight ratio of 75:25 respectively, 550 g of divinyl, 7.7 mg/equiv. of n-butyllithium and 5.8 mg/equiv. of a solution in toluene of a product of interaction between a phenolamine resin and sodium in formula I, wherein n=5, R is $C_8H_{17}$, $R_1$ is hydrogen. The reaction mass is heated to a temperature of 40° to 45° C. and maintained for 5 hours under stirring. On completion of the process the polymer is deactivated with isopropanol, washed and dried on hot rolls. The polymer yield is 100%. It has the following unit structure, %: 1,2-units 56.3; cis-1,4-units 18.5; trans-1,4-units 25.2. Mooney viscosity is 78.

EXAMPLE 7

Into a preliminary evacuated and nitrogen-filled apparatus there are charged 3,000 g of a mixture of cyclohexane with hexane-heptane fraction as in Example 6 hereinbefore, 500 g of divinyl, 6.5 mg/equiv. of n-butyllithium and 11.6 mg/equiv. of a solution in toluene of a product of interaction between a phenolamine resin and sodium of formula (I) wherein n=10, R is $C_8H_{17}$, $R_1$ is hydrogen. The reaction mass is heated to a temperature of from 35° to 40° C. and maintained for 5 hours under stirring. On completion of the process the polymer is deactivated with isopropanol, washed and dried on hot rolls. The polymer yield is 100%. It has the following unit structure: 1,2-units 32%, cis-1,4-units 37.7%, trans-1,4-units 30.3%. Mooney viscosity is 22.

EXAMPLE 8

Into a preliminary evacuated and nitrogen-filled apparatus there are charged 3,000 g of heptane-hexane fraction of gasoline with the boiling interval of from 64° to 92° C., 500 g of divinyl, 12 mg/equiv. of dilithium-polydivinyl, 11.6 mg/equiv. of a solution, in toluene, of a product of interaction between phenolamine resin and sodium of formula (I), wherein n=5, R is $C_8H_{17}$, $R_1$ is hydrogen. The reaction mass is heated to a temperature of 30° to 35° C. and maintained for 8 hours under stirring. On completion of the process the polymer is deactivated by isopropanol, washed and dried on hot rolls. The polymer yield is 100%. Mooney viscosity is 21. The content of 1,2-units is 44%, trans-1,4-units is 24.5%.

EXAMPLE 9

Into a preliminary evacuated and nitrogen-filled apparatus there are charged 3,200 g of cyclohexane, 130 g of vinylnaphthalene, 310 g of piperylene, 5 mg/equiv. of lithium in the form of 1,2,4,6-tetralithiumcyclohexane and 10 mg/equiv. of potassium in the form of a solution, in cyclohexane, of a product of interaction of phenolamine resin and potassium of formula (I), wherein $n=10$, R is $C_{20}H_{41}$, $R_1$ is $C_6H_{13}$. The reaction mass is heated to the temperature of 65° C. and maintained for 3 hours under stirring. On completion of the reaction, the polymer is deactivated with water and dried in an air drier. The yield of the polymer is 430 g (100%). Intrinsic viscosity is 1.8 dl/g (toluene, 25° C.).

EXAMPLE 10

Into a preliminary evacuated and nitrogen-filled apparatus there are charged 6,000 g of a mixture of cyclohexane with hexane-heptane fraction in a manner similar to that of Example 6 hereinbefore, 1,100 g of divinyl and 22 mg/equiv. of n-butyllithium, 8.35 mg/equiv. of divinylbenzene and 15.75 mg/equiv. of a product of interaction between a phenolamine resin and sodium of formula (I), wherein $n=10$, R is $C_2H_5$, $R_1$ is hydrogen. The reaction mass is heated to 40°–42° C. and maintained at this temperature for 4 hours under stirring. On completion of the process, the polymer is deactivated with isopropanol, washed and dried on hot rolls. The polymer yield is 100%; the structure of the divinyl portion is as follows: trans-1,4-units 22%, 1,2-units 54%. Mooney viscosity is 67.5.

EXAMPLE 11

Into a reactor there are charged 7,800 g of cyclohexane, 920 g of vinyltoluene, 1 liter of a solution of polyisoprenyllithium with a molecular weight of about 350 and the total content of active lithium of 0.5 mg/equiv.; 1 liter of a 0.5 N solution of a product of interaction between a phenolamine resin and sodium (135 g) of formula (I), wherein $n=4$, R is $C_8H_{17}$, $R_1$ is an alkylaryl $C_9H_{11}$. The reaction mass is maintained for two hours at the temperature of 50° C., the polymer is recovered by steam distillation and dried in vacuum to give 1,130 g (100%) of a block-copolymer with the molecular weight of 2,000 and the structure of the AB type, wherein A is polyisoprene, B is polyvinyltoluene; the content of phenolamine resin is 12%.

EXAMPLE 12

Into a preliminary evacuated and nitrogen-filled apparatus there are charged 3,000 g of hexane-heptane fraction with the boiling range of from 64° to 92° C., 500 g of transpiperylene, 10 mg/equiv. of lithium in the form of dilithiumpolydivinyl (0.35 N solution in the hexane-heptane fraction) and 6 mg/equiv. of potassium in the form of a solution, in toluene, of a product of interaction of a phenolamine resin and potassium of formula (I), wherein $n=5$, R is $C_8H_{17}$, $R_1$ is hydrogen. The reaction mass is heated to the temperature of 80° C. and maintained for 6 hours at this temperature under stirring. On completion of the reaction, the polymer is deactivated with isopropanol, washed and dried on hot rolls. The polymer yield is 450 g (95%). Intrinsic viscosity (toluene, 25° C.) is 2.1 dl/g. The structure of the polymer is as follows, %:

trans-1,4-1,2-units: 65.0
3,4-units: 3.3
1,2-units: 18.9.

EXAMPLE 13

Into a preliminary evacuated and nitrogen-filled apparatus there are charged 3,000 g of hexane-heptane fraction with the boiling range of from 64° to 92° C., 220 g of butadiene, 220 g of piperylene (consisting of 93.0% by weight of transform and 7% by weight of cis-form), 5 mg/equiv. of n-butyllithium (as a 0.5 N solution in the hexane-heptane fraction) and 2.5 mg/equiv. of potassium as a solution, in toluene, of a product of interaction between a phenolamine resin and potassium of formula (I), wherein $n=5$, R is $C_8H_{17}$, $R_1$ is hydrogen. The reaction mass is heated to the temperature of 80° C. and maintained at this temperature for 4 hours under stirring. On completion of the polymerization process, the polymer thus-produced is deactivated with isopropanol, washed and dried on hot rolls. The polymer yield is 400 g (95%). Intrinsic viscosity of the polymer is 2.4 dl/g (toluene, 25° C.). Karrer plasticity is 0.40.

EXAMPLE 14

Into a preliminary evacuated and nitrogen-filled apparatus there are charged 600 g of isopentane, 450 g of styrene; the mixture is cooled to the temperature of −30° C. and added with 10 mg/equiv. of n-butyllithium (as a 0.5 N solution in hexane-heptane fraction) and 0.7 mg/equiv. of sodium as a solution, in toluene, of a product of interaction of a phenolamine resin and sodium of formula (I), wherein $n=5$, R is $C_8H_{17}$, $R_1$ is hydrogen. The reaction mass is maintained at the temperature of −30°C. under stirring for 2 hours. On completion of the polymerization process, the resulting polymer is deactivated with isopropanol. The suspension of polystyrene in isopentane is poured onto a filter. The polystyrene crumb separated from isopentane is dried in a vacuum cabinet at the temperature of 60° C. The polymer yield is 450 g (100).

EXAMPLE 15

Into a preliminary evacuated and nitrogen-filled apparatus there are charged 3,000 g of toluene, 220 g of styrene, 10 mg/equiv. of n-butyllithium as a 0.5 N solution in hexane-heptane fraction and 4 mg/equiv. of sodium as a solution, in toluene, of a product of interaction of a phenolamine resin and sodium of formula I, wherein $n=5$, R is $C_8H_{17}$, $R_1$ is hydrogen. The reaction mass is heated to the temperature of 150° C. and maintained at this temperature under stirring for 30 minutes. On completion of the polymerization process, the reaction mass is cooled, deactivated with isopropanol, the polymer is washed with isopropanol and dried on hot rolls. The polymer yield is 340 g.

EXAMPLE 16

Into a preliminary evacuated and nitrogen-filled apparatus there are charged 800 g of hexane-heptane fraction with the boiling range of from 64° to 92° C., 420 g of styrene, 1 g of divinylbenzene, 10 mg/equiv. of n-butyllithium (as a 0.5 N solution in the hexane-heptane fraction), and 2 mg/equiv. of sodium as a solution, in toluene, of a product of interaction between a phenolamine resin and sodium of formula (I), wherein $n=5$, R is $C_8H_{17}$, $R_1$ is hydrogen. The reaction mass is heated under stirring to the temperature of 100° C. and maintained at this temperature for 2 hours. On completion of the polymerization process, the reaction mass is cooled and deactivated with isopropanol. The suspension of polystyrene in the hexane-heptane fraction is poured into a filter. The polystyrene crumb separated from the hexane-heptane fraction is dried in a vacuum-drying cabinet at the temperature of 60° C. The polymer yield is 420 g (100%).

EXAMPLE 17

Into a preliminary evacuated and argon-filled apparatus there are charged 80 g of isopentane, 20 g of divinylbenzene, 0.001 M of n-butyllithium and 0.0001 g-atom of sodium as a solution, in cyclohexane, of a product of interaction between a phenolamine resin and sodium of formula (I) wherein n=5, R is $C_8H_{17}$, $R_1$ is hydrogen. The reaction mass is maintained under stirring at the temperature of 20° C. On completion of the reaction, the reaction mass is treated with isopropanol. The polymer yield is equal to 10.1 g (50%).

EXAMPLE 18

Into a preliminary evacuated and argon-filled apparatus there are charged 20 g of divinylbenzene, 20 g of divinylnaphthalene, 160 g of hexane fraction, 0.002 M of n-butyllithium and 0.0003 g-atom of potassium as a solution in cyclohexanone, of a product of interaction between a phenolamine resin and potassium of formula (I), wherein n=5, R is $C_8H_{17}$, $R_1$ is hydrogen. The reaction mass is maintained for 4 hours at the temperature of −30° C. Then the reaction mass is treated with isopropanol. The yield of the polymer is 4 g.

EXAMPLE 19

Into a preliminary evacuated and nitrogen-filled apparatus there are charged 3,000 g of hexane-heptane fraction with the boiling range of from 64° to 92° C., 300 g of isoprene, 200 g of trans-piperylene, 6 mg/equiv. of n-butyllithium (as a 0.5 N solution in the hexane-heptane fraction) and 3.5 mg/equiv. of potassium in the form of a solution, in toluene, of a product of interaction between a phenolamine resin and potassium of formula (I), wherein n=5, R is $C_8H_{17}$, $R_1$ is hydrogen. The reaction mass is heated to the temperature of 80° C. under stirring and maintained at this temperature for 4 hours. On completion of the polymerization process, the resulting polymer is deactivated by means of isopropanol, washed and dried on hot rolls. The yield of the polymer is equal to 480 g (95%). Intrinsic viscosity of the polymer (as determined in toluene at the temperature of 25° C.) is 2.65 dl/g.

What is claimed is:

1. A process for producing carbo-chain homopolymers, block- and random copolymers of conjugated dienes with vinylaromatic monomers comprising polymerization of monomers selected from the group consisting of dienes, vinylaromatic monomers and divinylaromatic monomers, or copolymerization thereof in a medium of a hydrocarbon solvent at a temperature ranging from −30° to +150° C. in the presence of an organolithium catalyst of the formula $R(Li)_x$, wherein R is selected from the group consisting of a hydrocarbon radical and a diene polymer; x is selected from the group of integers, of from 1 to 4; and a modifying additive comprising a product of interaction between a phenolamine resin and an alkali metal and having the formula:

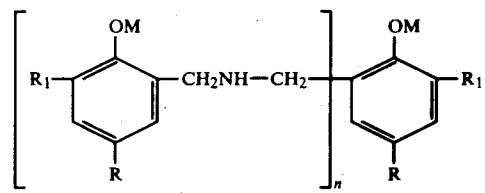

wherein n is selected from the group of integers of from 1 to 10; M is selected from the group consisting of sodium and potassium; R is selected from the group consisting of an alkyl with a number of carbon atoms of from 2 to 20 and an arylalkyl with a number of carbon atoms of from 7 to 20; $R_1$ is selected from the group consisting of an alkyl with a number of carbon atoms of from 1 to 6, and an arylalkyl with a number of carbon atoms of from 7 to 9, and a hydrogen; said modifying additive being taken in an amount of from 0.07 g/equiv. per one g/equiv. of active lithium of said organolithium catalyst.

2. A process as claimed in claim 1, wherein as the organolithium catalyst a catalyst is used which is selected from the group consisting of n-butyllithium, sec.-butyllithium, dilithiumpolydivinyl and polyisoprenyllithium.

3. A process as claimed in claim 1, wherein as the hydrocarbon solvent a solvent is employed which is selected from the group consisting of cyclohexane, toluene, isopentane, hexane petroleum fraction and hexane-heptane petroleum fraction.

4. A process as claimed in claim 1 in which R is alkyl of 2 to 20 carbon atoms and $R_1$ is alkyl of 1 to 6 carbon atoms of hydrogen.

5. A process as claimed in claim 1, 2 or 3 in which a copolymer of a conjugated diene and a vinylaromatic monomer is produced.

6. A process as claimed in claim 1, 2 or 3 in with a homopolymer or copolymer of conjugated diene is produced.

7. A process as claimed in claim 1, 2 or 3 in which a homopolymer or copolymer of vinylaromatic monomer is produced.

* * * * *